(12) United States Patent
Drew

(10) Patent No.: US 11,447,202 B2
(45) Date of Patent: Sep. 20, 2022

(54) BICYCLE SEAT COVER

(71) Applicant: Delta Cycle Corporation, Randolph, MA (US)

(72) Inventor: Errol Drew, Los Gatos, CA (US)

(73) Assignee: Delta Cycle Corporation, Randolph, MA (US)

( * ) Notice: Subject to any disclaimer, the term of this patent is extended or adjusted under 35 U.S.C. 154(b) by 0 days.

(21) Appl. No.: 17/492,979

(22) Filed: Oct. 4, 2021

(65) Prior Publication Data

US 2022/0153372 A1     May 19, 2022

Related U.S. Application Data

(60) Provisional application No. 63/114,580, filed on Nov. 17, 2020.

(51) Int. Cl.
   *B62J 1/22*     (2006.01)
   *B62J 1/00*     (2006.01)
   *B62J 1/20*     (2006.01)

(52) U.S. Cl.
   CPC .............. *B62J 1/22* (2013.01); *B62J 1/002* (2013.01); *B62J 1/20* (2013.01)

(58) Field of Classification Search
   CPC ....... B62J 1/22; B62J 1/002; B62J 1/20; B62J 1/18
   USPC .................................................. 297/219.11
   See application file for complete search history.

(56) References Cited

U.S. PATENT DOCUMENTS

| | | | |
|---|---|---|---|
| 3,008,190 A | 11/1961 | Mesinger | |
| 3,514,156 A | 5/1970 | Fields | |
| 4,451,083 A | 5/1984 | Marchello | |
| 5,203,607 A * | 4/1993 | Landi | B62J 1/26 428/116 |
| 6,019,425 A | 2/2000 | Yates | |
| 6,131,994 A | 10/2000 | Yates | |
| 6,739,656 B2 * | 5/2004 | Yu | B62J 1/00 297/202 |
| 7,547,064 B2 * | 6/2009 | Garneau | B62J 1/00 297/195.1 |
| 10,750,872 B2 | 8/2020 | Petty | |
| 2015/0197171 A1 * | 7/2015 | Bigolin | B60N 2/5664 297/214 |
| 2020/0094900 A1 * | 3/2020 | Supowitz | B62J 1/26 |

FOREIGN PATENT DOCUMENTS

| | | | | |
|---|---|---|---|---|
| CN | 201901202 U | * | 7/2011 | |
| CN | 102159104 B | * | 7/2013 | ............. A41D 1/084 |
| CN | 206856849 U | * | 1/2018 | |
| JP | 3143010 U | | 7/2008 | |

OTHER PUBLICATIONS

Written Opinion of the International Application No. PCT/US21/59715, dated Feb. 15, 2022, (nine (9) pages).

* cited by examiner

*Primary Examiner* — Milton Nelson, Jr.

(74) *Attorney, Agent, or Firm* — Iandiorio Teska & Coleman, LLP

(57) ABSTRACT

A bicycle seat cover for a bicycle seat with a rigid substrate and a cushion thereon, includes a stretchable polymeric layer forming a top surface, a seat horn cover, a seat conforming sidewall, and a partial seat bottom surface covering and integral honeycomb cells extending from an underside of the top surface, each cell closed at its top by the top surface and open at its bottom.

13 Claims, 5 Drawing Sheets

BICYCLE SEAT COVER

RELATED APPLICATIONS

This application claims benefit of and priority to U.S. Provisional Application Ser. No. 63/114,580 filed Nov. 17, 2020, under 35 U.S.C. §§ 119, 120, 363, 365, and 37 C.F.R. § 1.55 and 1.78, which is incorporated herein by this reference.

FIELD OF THE INVENTION

This disclosure relates to bicycle seat covers.

BACKGROUND OF THE INVENTION

Bicycle seats or saddles usually include a rigid shell or substrate with rails attachable to a bicycle seat post and some kind of padding on the shell. The seat nose or horn fits between the rider's legs. Saddle sores and chafing are known problems with existing bicycle seats. See U.S. Pat. No. 10,486,760 incorporated herein by this reference. Accordingly, seats of various configurations have been proposed. Different padding arrangements have also been proposed. And, seat covers have also been proposed. See U.S. Pat. Nos. 6,131,944 and 5,203,607 incorporated herein by this reference. Some seats and seat covers employ honeycomb padding in various configurations.

BRIEF SUMMARY OF THE INVENTION

Still riders sometimes still experience saddle sores and chafing and many bicycle seats and covers are not waterproof.

Featured in one aspect is a new bicycle seat cover which reduces saddle sores and chafing. In one aspect, provided is a bicycle seat cover which is waterproof. In another aspect, provided is a new bicycle seat cover which is easy to manufacture and which is inexpensive.

Featured is a bicycle seat cover for a bicycle seat with a rigid substrate and a cushion thereon. The preferred cover includes a stretchable polymeric layer forming a top surface, a seat horn cover, a seat conforming sidewall and a partial seat bottom surface covering and integral honeycomb cells extending from an underside of the top surface, each cell closed at its top by the top surface and open at its bottom.

Preferably, the cells have varying thickness, for example the cells proximate the sidewall are thinner than the cells interior of the sidewall and the cells proximate the seat horn cover are thinner than the cells interior of the sidewalls.

In one design, the top surface includes a longitudinally extending depression and the cells extending from the underside of the depression are preferably thinner than the cells interior of the underside of the depression. The bottom of the cells preferably lie in the same plane. In one example, the cells are hexagonal. Also featured is a bicycle seat cover for a bicycle seat, the cover. A waterproof polymeric layer is preformed into the shape of the bicycle seat, is stretchable to deploy the seat cover over and about the bicycle seat, and when released rebounds conforming to the shape of the bicycle seat and affixed thereto without slippage. Integral honeycomb cells extend from an underside of the polymeric layer engaging the bicycle seat.

Preferably, the polymeric layer is preformed into a seat cover portion, a sidewall portion, a horn covering portion, and a partial seat bottom surface covering with an opening therein.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
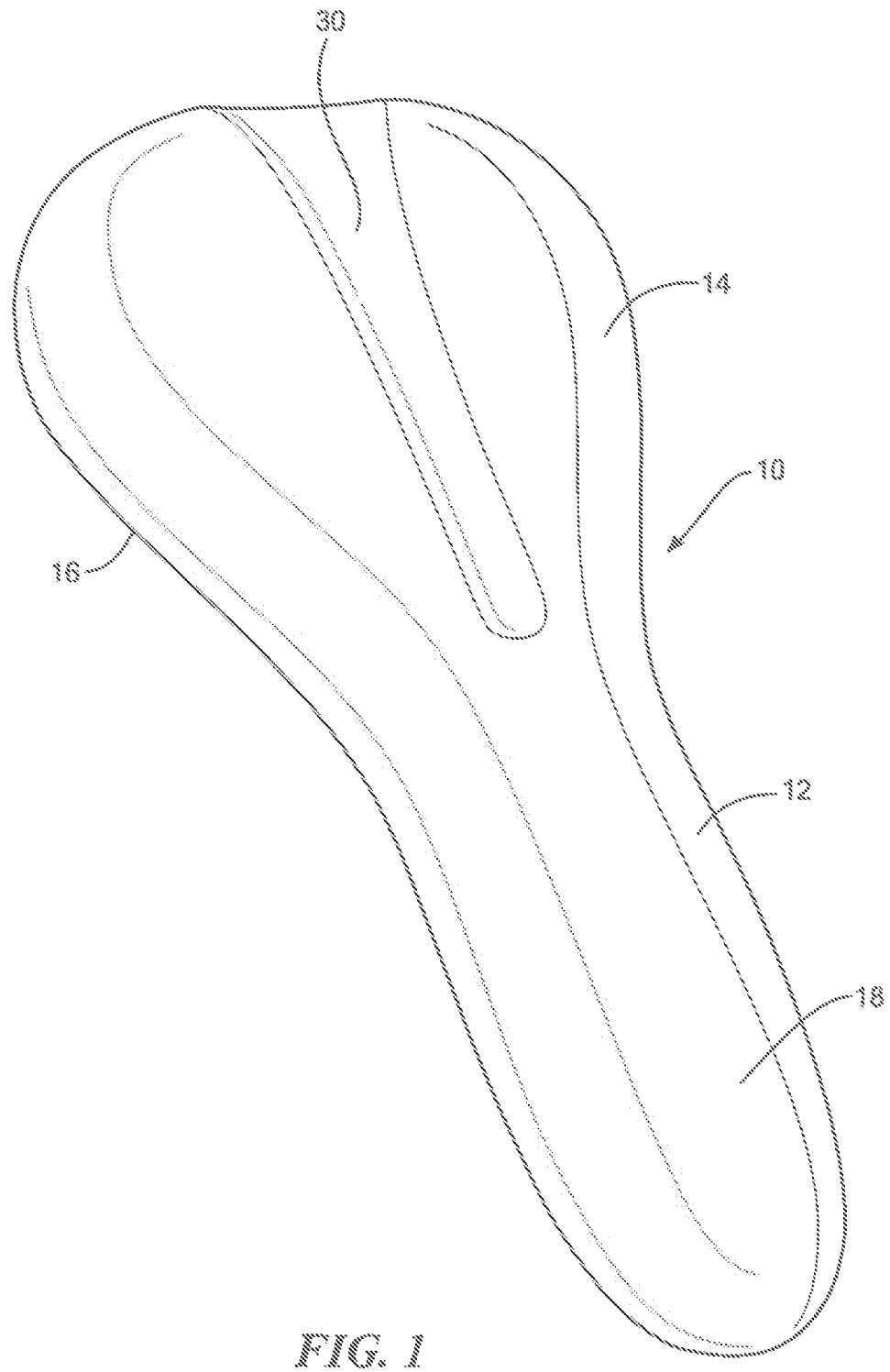
FIG. 1 is a top view of a preferred embodiment of an example of a seat cover.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
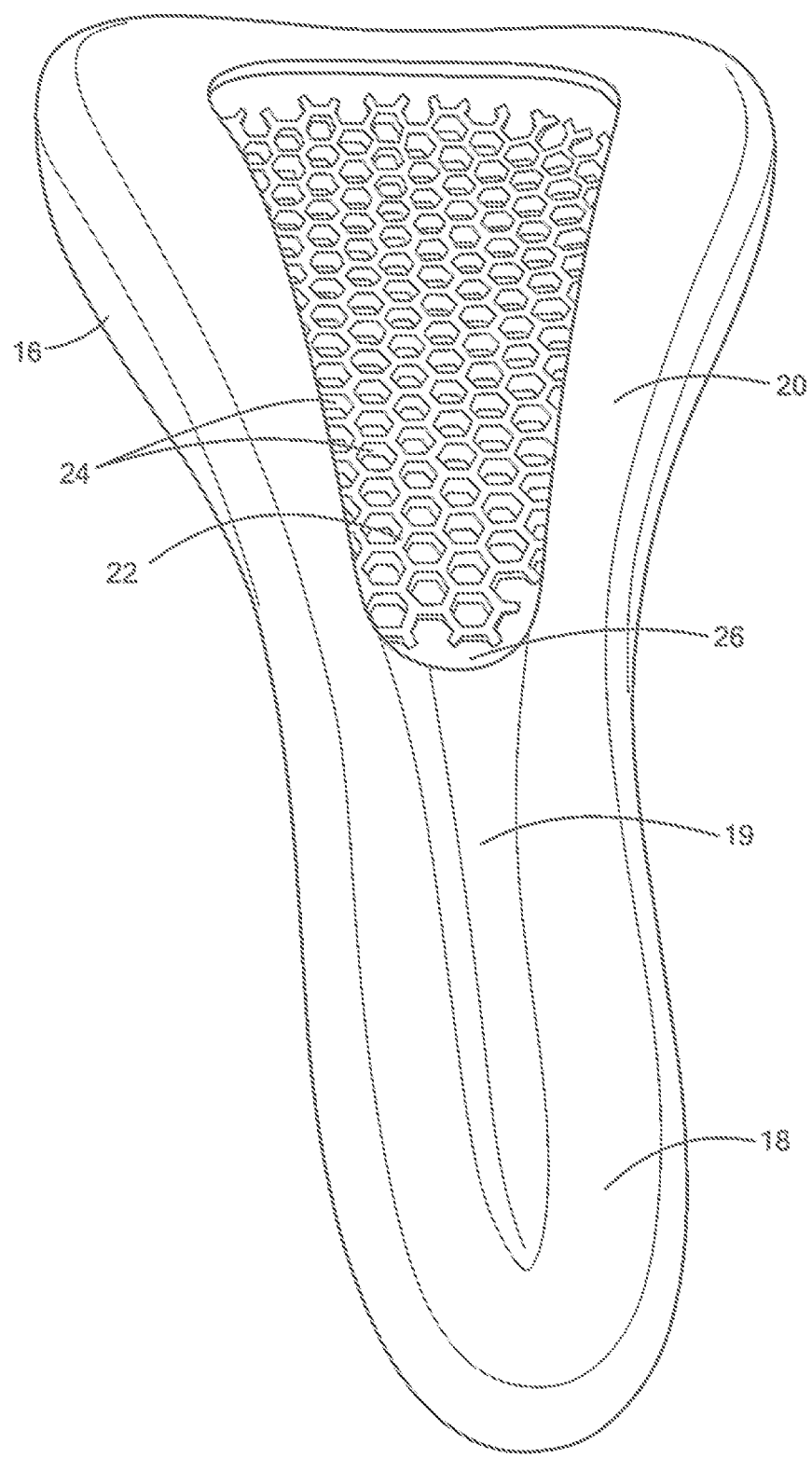
FIG. 2 is a schematic view of the bottom of the seat cover of FIG. 1.

Bicycle cover 10, FIG. 1 is preferably molded and made of a stretchable polymeric layer 12 (e.g., silicone) preferably rendering the seat cover waterproof and providing a cushioning effect. The layer 12 forms a top (scaling) surface 14 which will overlay the existing seat cushion of the bicycle seat, seat conforming sidewall 16, and seat horn cover portion 18. Conforming sidewall 16 covers the left sidewall of the seat, the rear sidewall, and the right sidewall. As shown in FIGS. 1-2, the seat horn cover portion covers the top, sides, and preferably the bottom of the horn. FIG. 2 also shows partial seat bottom covering portion 20 which stretches over the seat cushion and resides underneath the seat shell periphery. Opening 22 in bottom covering portion allows the seat cover to be deployed onto the bicycle seat and removed if desired. Because seat cover 10 is made of a molded layer of silicone, in one example, it is stretchable to be deployed onto and about the seat and firmly resides in place without any slippage once deployed. The underside of the polymeric layer preferably has a sticky texture to prevent movement of the cover relative to the seat. The outer side of the polymeric layer is slicker to prevent rider chafing. The outer layer may be treated by spraying on a polymer (e.g., Parlylene). The polymer chemically bonds to the molded material and provides an improved tactile feel.

Cover 10 also features integral honeycomb (e.g., hexagonal) cells 24 formed in the mold and extending from the underside 26 of the top surface 14. Each cell is preferably closed at its top by the underside 26 of the top seat covering portion and each cell is preferably open at its bottom as shown.

Cover 10, FIG. 1 may include longitudinally extending molded depression 30 in top surface 14 conforming to a similar depression in many bicycle seats. The underside of horn covering portion 18 may also include a molded depression 19, FIG. 2.

Figure 3:
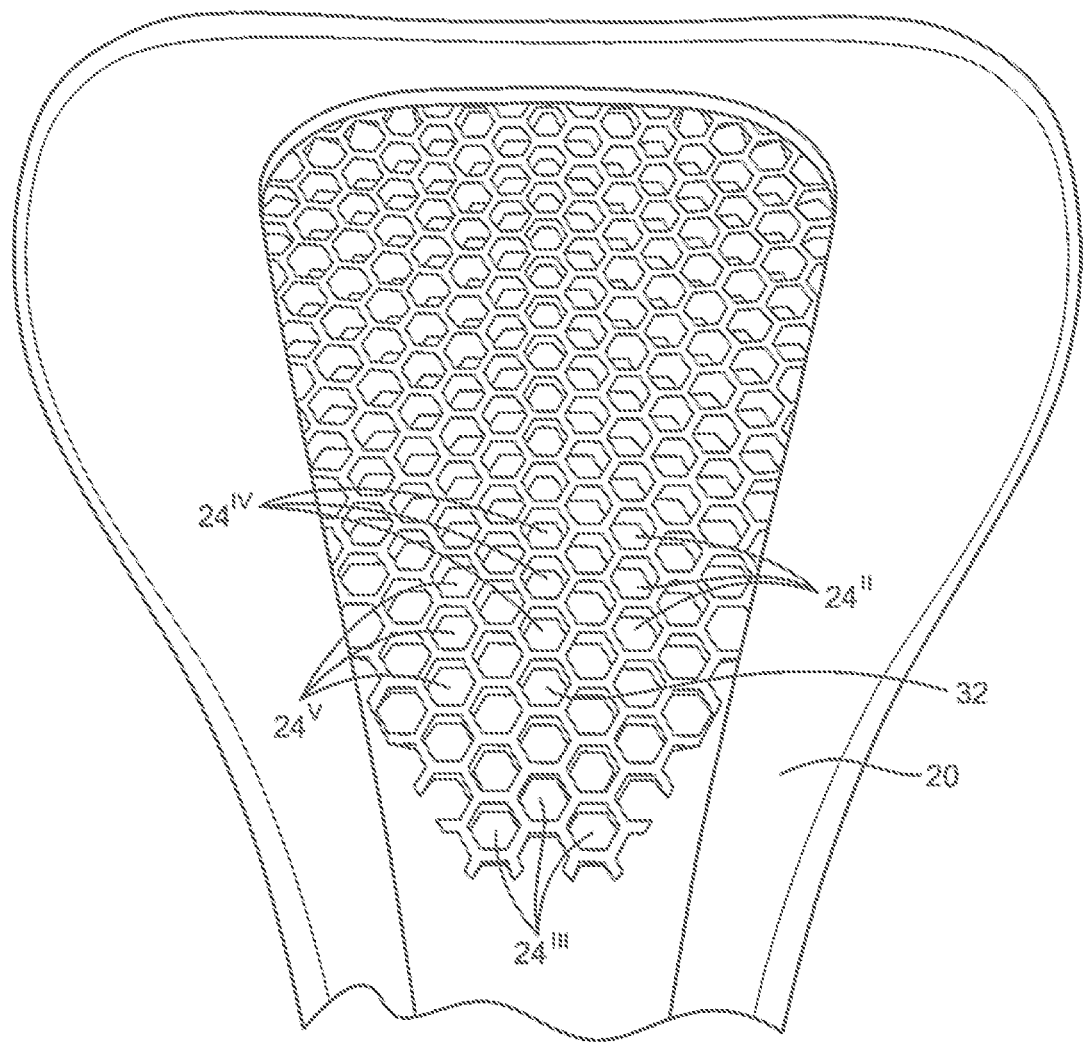
FIG. 3 is another schematic view of the bottom of the seat cover of FIGS. 1-2.
Figure 4:
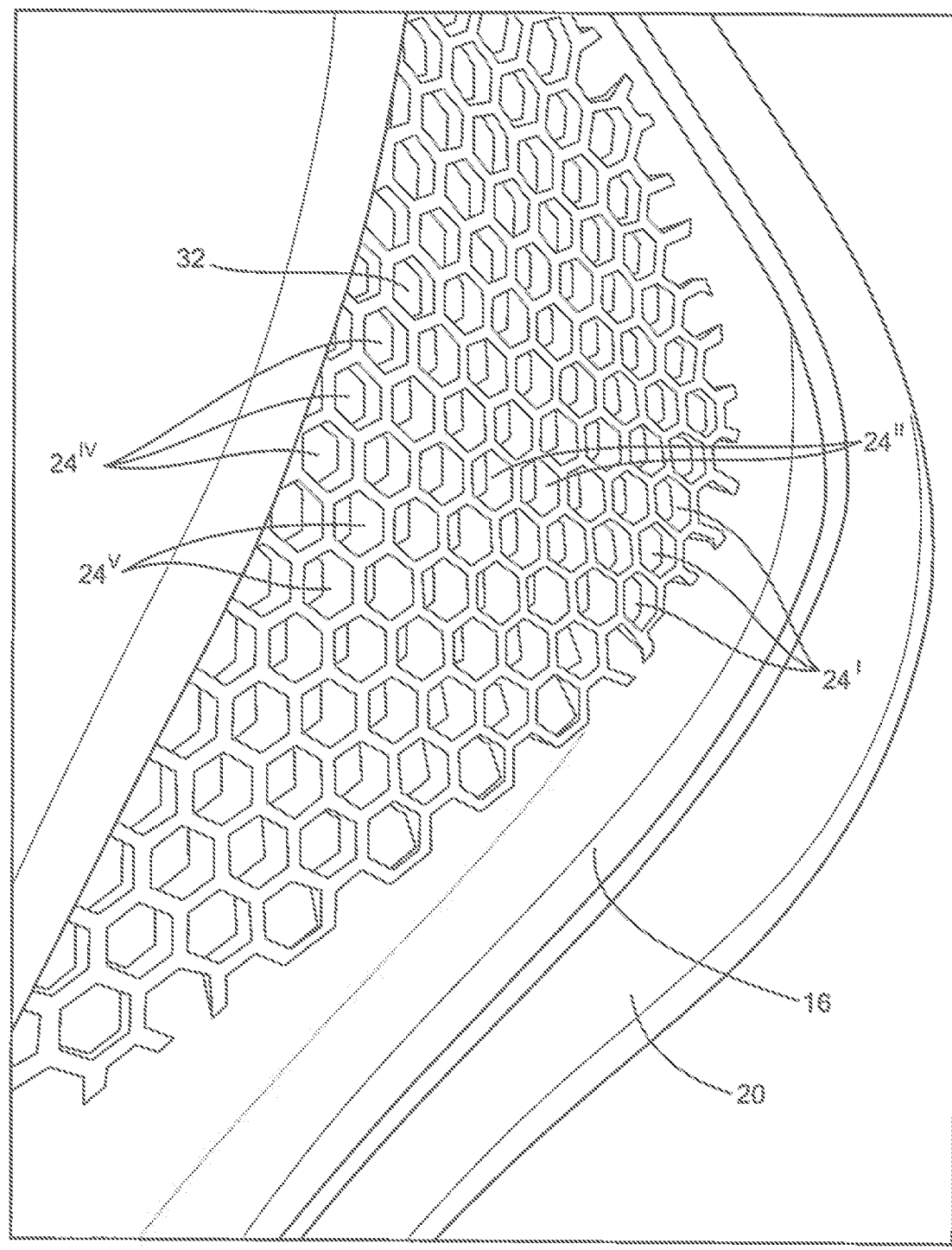
FIG. 4 is another schematic view of a portion of the bottom of the seat cover.
Figure 5:
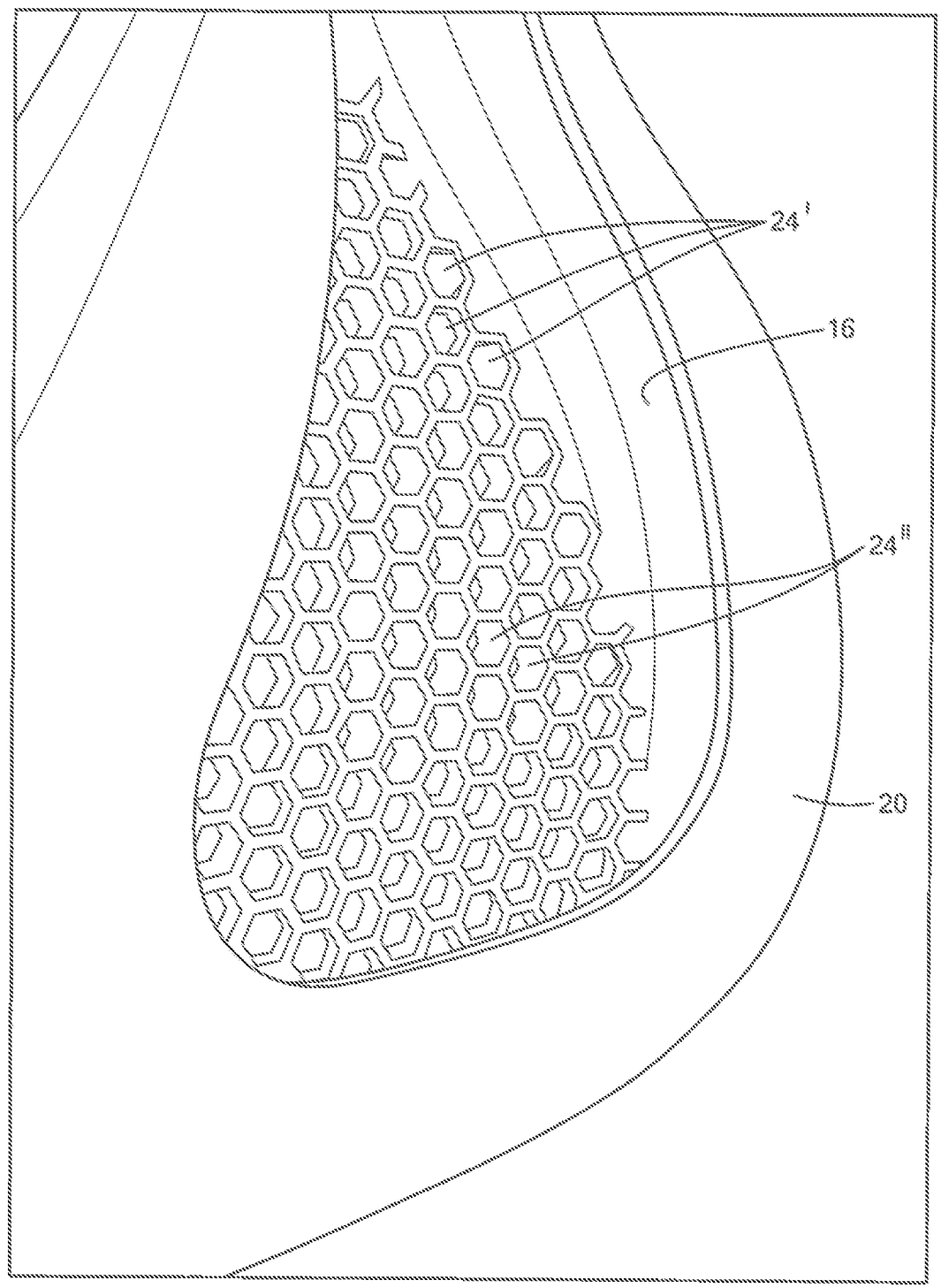
FIG. 5 is a schematic view showing another portion of the bottom of the seat cover.

In one version, the wall thickness of the polymeric layer was 0.05 inches. The honeycomb cells may vary in their extent but preferably reside only below the main seat portion and not in the nose or horn portion. And, for added comfort, the cells can vary in thickness. In the example shown in FIGS. 3-5, the cells 24' proximate the underside of the sidewall covering portion 16 are thinner than the cells 24" interior of the sidewalls. Also, the cells 24'" proximate the underside of the seat horn cover portion 18 are thinner than the cells 24" interior of the underside of the sidewall covering portion. Also, the cells $24^{iv}$ extending from the underside 32 of depression 30 are thinner than the cells $24^v$ interior of the underside 32 of depression 30. The cells may range in thickness from 1/32 to 5/8 inch. In other embodiments, the cell wall thickness or even the cell material may vary to tune the cushioning effect at various regions of the cover. In the version shown, the bottom of the cells generally lie in the same plane (when the cover is pressed flat). The cushioning cells thus extend from their closed tops at the underside 26 of the seat covering portion 14 to their open bottoms which engage the top of the existing seat cushion providing an air cushion to alleviate saddle sores and chafing. The cover is easy and inexpensive to manufacture.

Like a swim cap, the seat cover stretches over the seat and snaps into place making it easy and self-evident to deploy. Once in place, the cover stays in place without slippage. In one embodiment, the waterproof polymeric layer is preformed into the shape of the bicycle seat as shown in FIG. 1 and yet is stretchable to deploy the seat cover over and about the bicycle seat. When released, the waterproof polymeric layer rebounds conforming to the shape of the bicycle seat and is affixed thereto without slippage. In the preferred version shown, the polymeric layer is preformed into a seat cover portion, a sidewall, a horn covering portion, and a partial seat bottom surface covering with an opening therein. In other embodiments, for different styles of seats, the polymeric layer can be performed to cover a particular seat style.

The basic dimensions of the seat cover in its relaxed state are preferably slightly smaller than the bicycle seat the cover will be applied to. That way, the cover can be stretched over the seat and then rebounds to tightly fit on the bicycle seat. In this way, a given seat cover can be used with a wide variety of bicycle seats of different sizes and configurations.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. A bicycle seat cover for a bicycle seat with a rigid substrate and a cushion thereon, the cover comprising:
   a stretchable polymeric layer forming a top surface, a seat horn cover, a seat conforming sidewall, and a partial seat bottom surface covering;
   integral honeycomb cells extending from an underside of the top surface, each cell closed at its top by the top surface and open at its bottom;
   the cells proximate the sidewall being thinner than the cells interior of the sidewall.

2. The cover of claim 1 in which the bottom of the cells lie in the same plane.

3. The cover of claim 1 in which the cells are hexagonal.

4. The cover of claim 1 in which the cells proximate the seat horn cover are thinner than the cells interior of the sidewalls.

5. The cover of claim 1 in which the top surface includes a longitudinally extending depression.

6. The cover of claim 5 in which the cells extending from the underside of the depression are thinner than the cells interior of the underside of the depression.

7. A bicycle seat cover for a bicycle seat, the cover comprising:
   a waterproof polymeric layer preformed into the shape of the bicycle seat and having a seat cover portion and a sidewall portion and stretchable to deploy the seat cover over and about the bicycle seat, and when released rebounds conforming to the shape of the bicycle seat and affixed thereto without slippage;
   integral honeycomb cells extending from an underside of the polymeric layer engaging the bicycle seat; and
   the cells proximate the sidewall being thinner than the cells interior of the sidewall.

8. The cover of claim 7 in which the top surface includes a longitudinally extending depression.

9. The cover of claim 8 in which the cells extending from the underside of the depression are thinner than the cells interior of the underside of the depression.

10. The cover of claim 7 in which the polymeric layer is further preformed into a horn covering portion and a partial seat bottom surface covering with an opening therein.

11. The cover of claim 10 in which the cells proximate the horn covering portion are thinner than the cells interior of the sidewall.

12. The cover of claim 7 in which the bottom of the cells lie in the same plane.

13. The cover of claim 7 in which the cells are hexagonal.

* * * * *